(12) United States Patent
Isomura et al.

(10) Patent No.: US 11,353,632 B2
(45) Date of Patent: Jun. 7, 2022

(54) MULTI-LENS ARRAY, LIGHT SOURCE DEVICE, AND PROJECTOR

(71) Applicant: SEIKO EPSON CORPORATION, Tokyo (JP)

(72) Inventors: Tomoki Isomura, Matsumoto (JP); Kenji Niwa, Minowa-machi (JP); Takanori Miyazawa, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/206,281

(22) Filed: Mar. 19, 2021

(65) Prior Publication Data

US 2021/0294000 A1    Sep. 23, 2021

(30) Foreign Application Priority Data

Mar. 19, 2020    (JP) .............................. JP2020-048804

(51) Int. Cl.
*G02B 3/00*    (2006.01)
*G03B 21/20*   (2006.01)
*G02B 1/11*    (2015.01)

(52) U.S. Cl.
CPC .............. *G02B 3/0062* (2013.01); *G02B 1/11* (2013.01); *G03B 21/208* (2013.01)

(58) Field of Classification Search
CPC .. G02B 3/0062; G02B 3/0068; G02B 3/0056; G02B 1/11; G02B 27/0905; G03B 21/208
See application file for complete search history.

(56) References Cited

U.S. PATENT DOCUMENTS

2021/0215864 A1*   7/2021   Kawashita .............. B32B 7/023

FOREIGN PATENT DOCUMENTS

JP        2013-120349 A        6/2013
JP        2014-153417 A        8/2017

* cited by examiner

*Primary Examiner* — Ryan D Howard
(74) *Attorney, Agent, or Firm* — Dority & Manning, P.A.

(57) ABSTRACT

A multi-lens array according to the present disclosure includes a substrate part, a first multi-lens surface which includes a plurality of first lens surfaces, and which is provided to the substrate part, a light transmissive layer provided to the substrate part, and an antireflection layer disposed on the light transmissive layer, wherein the antireflection layer is higher in thermal conductivity than the light transmissive layer.

10 Claims, 7 Drawing Sheets

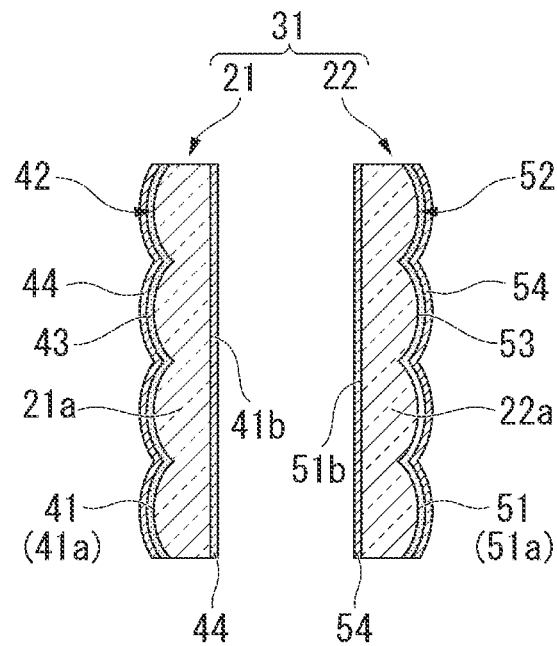
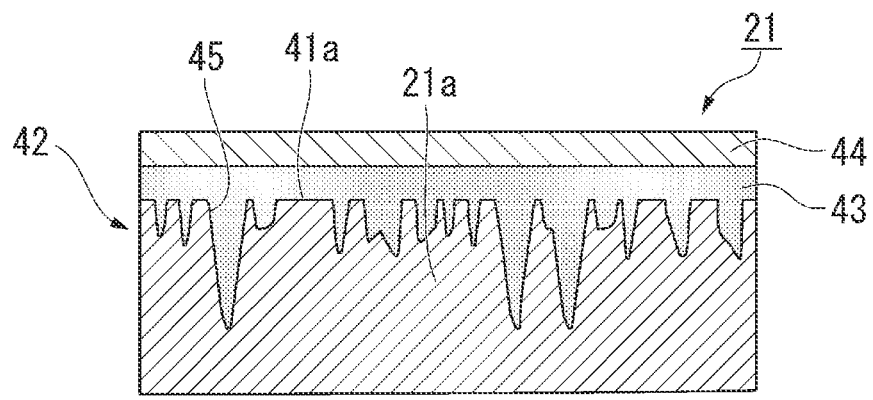
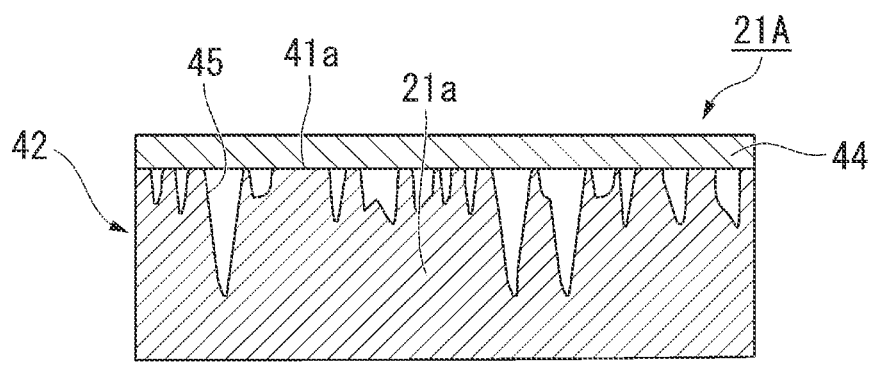

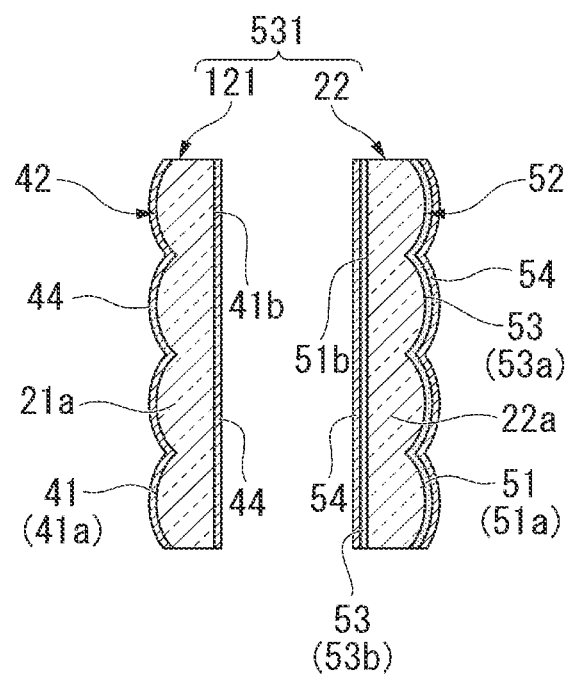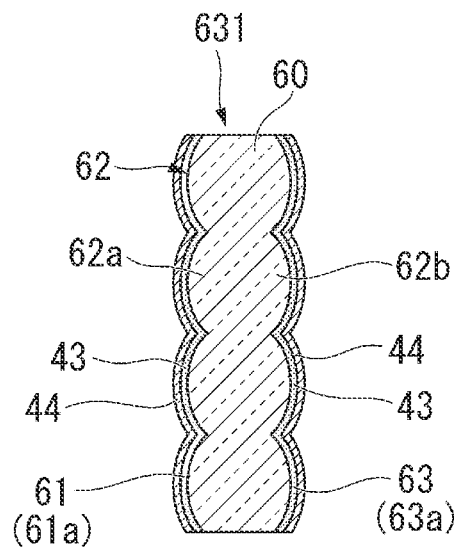

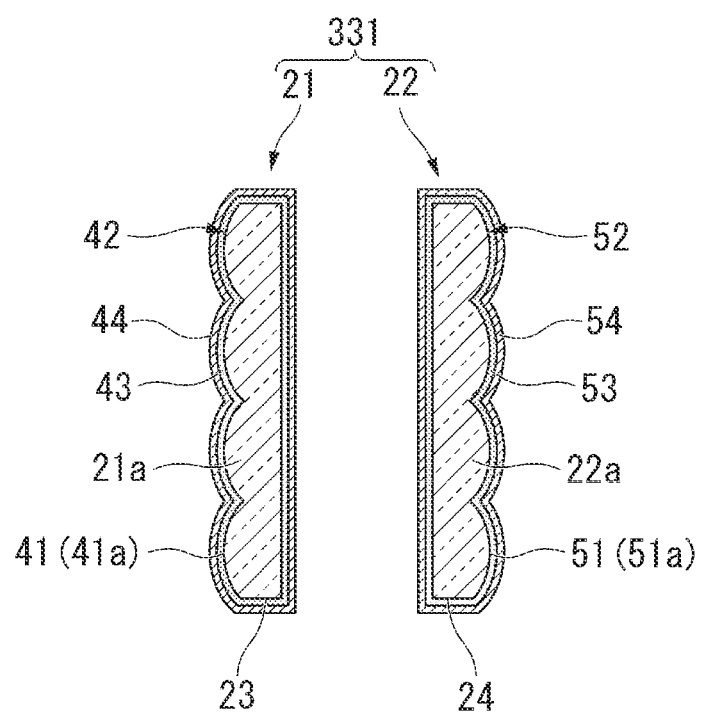

MULTI-LENS ARRAY, LIGHT SOURCE DEVICE, AND PROJECTOR

The present application is based on, and claims priority from JP Application Serial Number 2020-048804, filed Mar. 19, 2020, the disclosure of which is hereby incorporated by reference herein in its entirety.

BACKGROUND

1. Technical Field

The present disclosure relates to a multi-lens array, a light source device, and a projector.

2. Related Art

In the past, it has been known that a multi-lens array is used as an optical system of homogenously illuminating a liquid crystal panel as an illumination target area in a projector (see, e.g., JP-A-2013-120349).

In the projector, in order to realize high-luminance and high-contrast projection, a multi-lens array higher in accuracy becomes necessary, when the multi-lens array is molded using a metal mold, there is a possibility that the microscopic asperity of a surface of the metal mold is transferred to a lens surface of the multi-lens array.

Since the multi-lens array is disposed close to a light source in the projector, and is therefore easy to generate heat, it becomes important to enhance a radiation performance of the multi-lens array. In general, an antireflection layer is disposed on the lens surface in order to enhance the transmittance in some cases, but the thermal conductivity of $Ta_2O_5$, $Nb_2O_5$, or the like used as the antireflection layer is higher than the thermal conductivity of $SiO_2$ as a lens constituent material. Therefore, when the multi-lens array generates heat, the heat of the multi-lens array becomes difficult to be released toward the antireflection layer, and therefore, there is a problem that a crack occurs on the lens surface or the antireflection layer is separated due to the asperity transferred to the lens surface of the multi-lens array.

SUMMARY

In view of the problems described above, according to a first aspect of the present disclosure, there is provided a multi-lens array including a substrate part, a first multi-lens surface which includes a plurality of first lens surfaces, and which is provided to the substrate part, a light transmissive layer provided to the substrate part, and an antireflection layer disposed on the light transmissive layer, wherein the antireflection layer is higher in thermal conductivity than the light transmissive layer.

According to a second aspect of the present disclosure, there is provided a light source device including a light source, and an integrator optical system which light emitted from the light source enters, wherein the integrator optical system includes a first multi-lens array and a second multi-lens array, and at least one of the first multi-lens array and the second multi-lens array is formed of the multi-lens array according to the first aspect.

According to a third aspect of the present disclosure, there is provided a light source device including a light source, and an integrator optical system which light emitted from the light source enters, wherein the integrator optical system is constituted by the multi-lens array according to the first aspect.

According to a fourth aspect of the present disclosure, there is provided a projector including the light source device according to the second aspect or the third aspect of the present disclosure, a light modulation device configured to modulate light from the light source device in accordance with image information, and a projection optical device configured to project the light modulated by the light modulation device.

BRIEF DESCRIPTION OF THE DRAWINGS

FIG. 2 is a cross-sectional view showing a configuration of an essential part of an integrator optical system.

FIG. 3 is an enlarged view showing a configuration of an essential part of a first multi-lens array.

FIG. A is an enlarged view of an essential part showing a first multi-lens array according to a comparative example.

Figure 5:
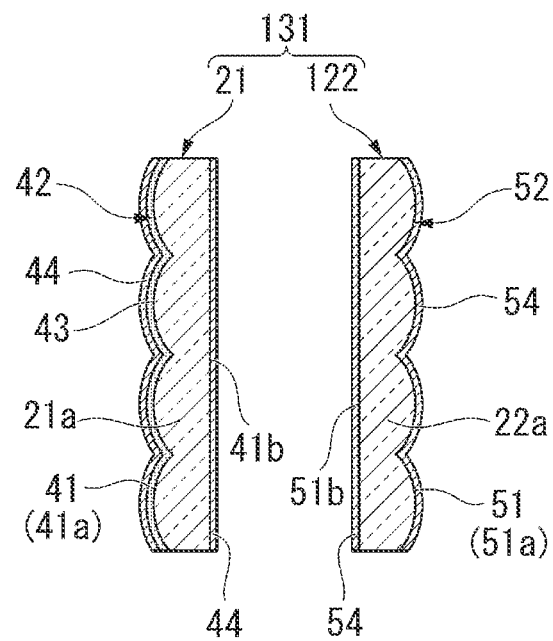

FIG. 5 is a cross-sectional view of an integrator optical system in a second embodiment.

Figure 6:
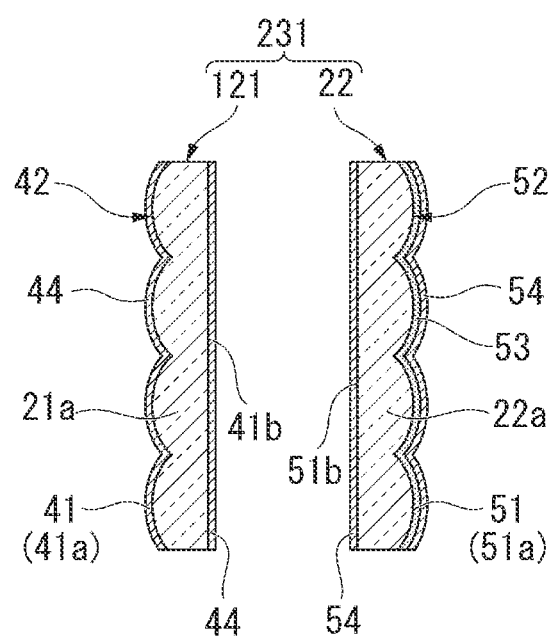

FIG. 6 is a cross-sectional view of an integrator optical system in a third embodiment.

Figure 7:
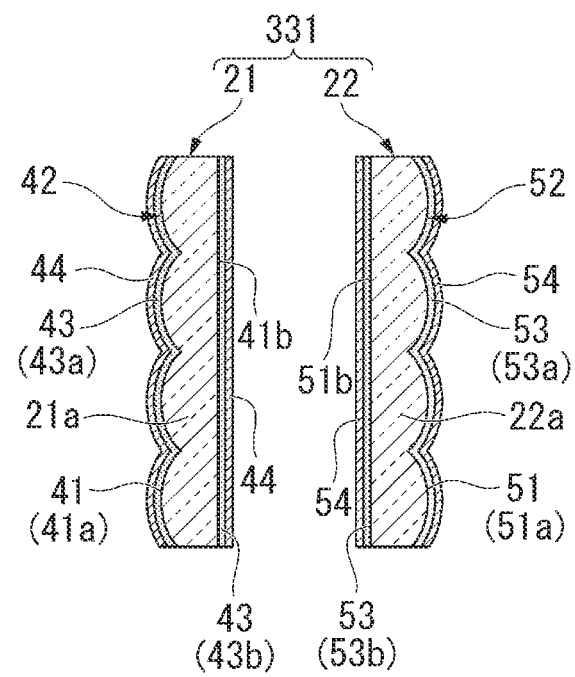

FIG. 7 is a cross-sectional view of an integrator optical system in a first modified example.

Figure 8:
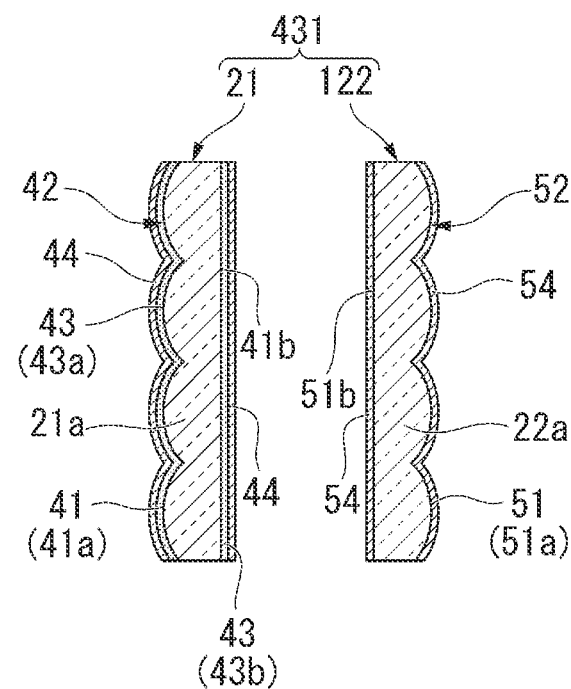

FIG. 8 is a cross-sectional view of an integrator optical system in a second modified example.

FIG. 9 is a cross-sectional view of an integrator optical system in a third modified example.

FIG. 10 is a cross-sectional view of an integrator optical system in a fourth embodiment.

Figure 11:
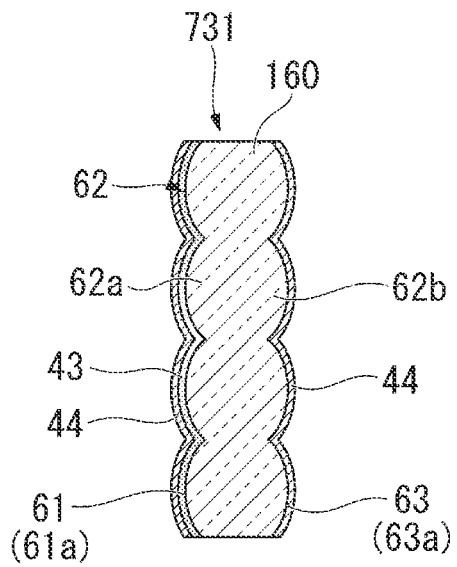

FIG. 11 is a cross-sectional view of an integrator optical system in a fifth embodiment.

Figure 12:
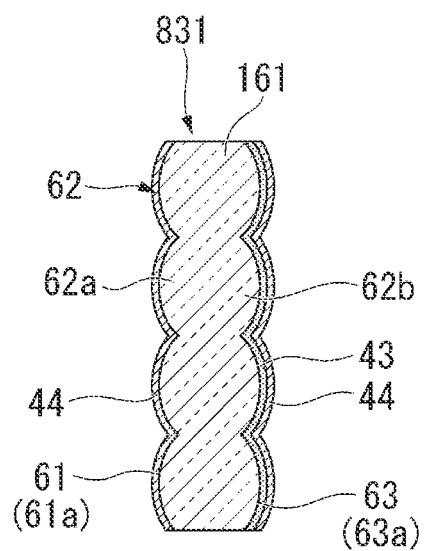

FIG. 12 is a cross-sectional view of an integrator optical system in a sixth embodiment.

FIG. 13 is a diagram showing a configuration example in which side surfaces of multi-lens arrays are covered with light transmissive layers.

DESCRIPTION OF EXEMPLARY EMBODIMENTS

Hereinafter, an embodiment of the present disclosure will be described using the drawings.

A projector according to the present embodiment is an example of a projector using liquid crystal panels as light modulation devices.

It should be noted that in each of the drawings described below, the constituents are shown with the scale ratios of respective sizes set differently between the constituents in some cases in order to facilitate the visualization of each of the constituents.

First Embodiment

Figure 1:
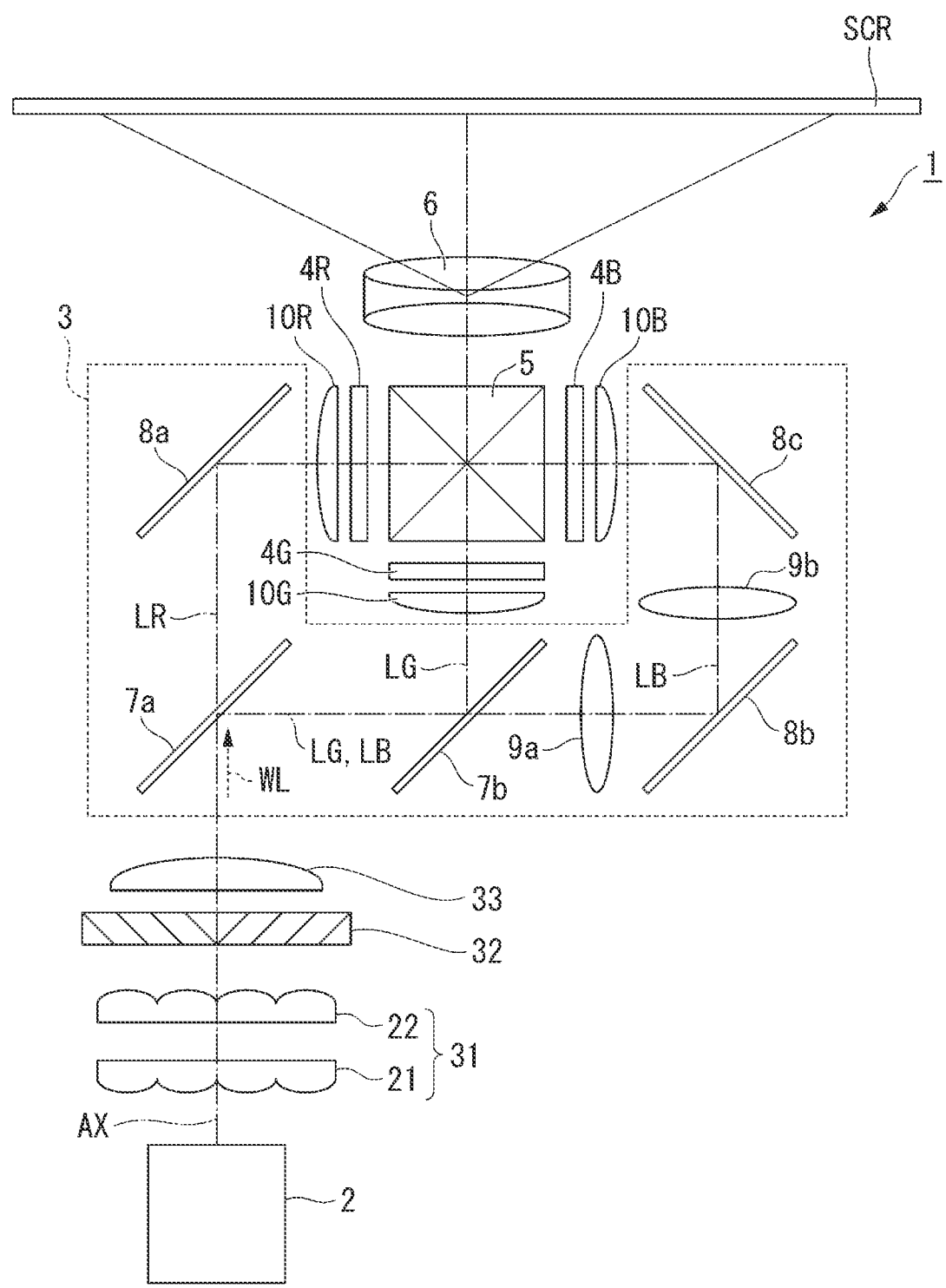
FIG. 1 is a diagram showing a configuration of a projector according to a first embodiment.

FIG. 1 is a diagram showing a configuration of the projector according to the present embodiment.

The projector 1 according to the present embodiment shown in FIG. 1 is a projection-type image display device for displaying a color image on a screen (a projection target surface) SCR. The projector 1 uses three light modulation devices corresponding to respective colored light beams, namely red light LR, green light LG, and blue light LB.

The projector 1 is provided with a light source device 2, a color separation optical system 3, a light modulation device 4R, a light modulation device 4G, a light modulation device 4B, a combining optical system 5, and a projection optical device 6.

The light source device 2 emits illumination light WL having a white color toward the color separation optical system 3. The color separation optical system 3 separates the illumination light WL having a white color into the red light LR, the green light LG, and the blue light LB. The color separation optical system 3 is provided with a first dichroic mirror 7a, a second dichroic mirror 7b, a first reflecting mirror 8a, a second reflecting mirror 8b, a third reflecting mirror 8c, a first relay lens 9a, and a second relay lens 9b.

The first dichroic mirror 7a separates the illumination light WL from the light source device 2 into the red light LR and the other light (the green light LG and the blue light LB). The first dichroic mirror 7a transmits the red light LR thus separated from, and at the same time reflects the other light (the green light LG and the blue light LB). Meanwhile, the second dichroic mirror 7b separates the other light into the green light LG and the blue light LB. The second dichroic mirror 7b reflects the green light LG thus separated from and transmits the blue light LB.

The first reflecting mirror 8a is disposed in the light path of the red light LR, and the red light LR which has been transmitted through the first dichroic mirror 7a is reflected by the first reflecting mirror 8a toward the light modulation device 4R. Meanwhile, the second reflecting mirror 8b and the third reflecting mirror 8c are disposed in the light path of the blue light LB, and the blue light LB which has been transmitted through the second dichroic mirror 7b is reflected by the second reflecting mirror 8b and the third reflecting mirror 8c toward the light modulation device 4B. Further, the green light LG Is reflected by the second dichroic mirror 7b toward the light modulation device 4G.

The first relay lens 8a and the second relay lens 9b are disposed at the light exit side of the second dichroic mirror 7b in the light path of the blue light LB. The first relay lens 9a and the second relay lens 9b correct a difference in illuminance distribution of the blue light LB due to the fact that the blue light LB is longer in optical path length than the red light LR and the green light LG.

The light modulation device 4R modulates the red light LP in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, at the incident side and the exit side of the liquid crystal panel, there are disposed polarization plates (not shown), respectively, and thus, there is formed a configuration of transmitting only the linearly polarized light with a specific direction.

At the incident side of the light modulation device 4R, the light modulation device 4G, and the light modulation device 4B, there are disposed a field lens 10R, a field lens 10G, and a field lens 10B, respectively. The field lens 10R, the field lens 10G, and the field lens 10B collimate principal rays of the red light LR, the green light LG, and the blue light LB which enter the light modulation device 4R, the light modulation device 4G, and the light modulation device 4B, respectively.

The combining optical system 5 combines the image light corresponding to the red light LR, the image light corresponding to the green light LG, and the image light corresponding to the blue light LB with each other in response to incidence of the image light respectively emitted from the light modulation device 4R, the light modulation device 4G, and the light modulation device 4B, and then emits the image light thus combined toward the projection optical device 6. As the combining optical system 5, there is used, for example, a cross dichroic prism.

The projection optical device 6 is constituted by a plurality of projection lenses. The projection optical device 6 projects the image light having been combined by the combining optical system 5 toward the screen SCR in an enlarged manner. Thus, an image is displayed on the screen SCR.

The light source device 2 according to the present embodiment is provided with a light source 20, an integrator optical system 31, a polarization conversion element 32, and a superimposing optical system 33. In the present embodiment, a known constituent such as a lamp, an LED, and a semiconductor laser is used as the light source 20, and the light source 20 emits the illumination light WL having a white color. Further, as the light source 20, it is possible to adopt a light source for preforming wavelength conversion on excitation light emitted from the LED or the semiconductor laser to thereby generate fluorescence.

The integrator optical system 31 is provided with a first multi-lens array 21, and a second multi-lens array 22. The illumination light WL having been transmitted through the integrator optical system 31 enters the polarization conversion element 32. The polarization conversion element 32 is constituted by polarization split films and wave plates arranged in an array. The polarization conversion element 32 uniforms the polarization direction of the illumination light WL into a predetermined direction. Specifically, the polarization conversion element 32 uniforms the polarization direction of the illumination light WL into a direction of a transmission axis of the incident side polarization plate of each of the light modulation devices 4R, 4G, and 4B.

Thus, the polarization direction of the red light LR, the green light LG, and the blue light LB obtained by separating the illumination light WL having been transmitted through the polarization conversion element 32 coincides with the transmission axis direction of the incident side polarization plate of each of the light modulation devices 4R, 4G, and 4B. Therefore, the red light LR, the green light LG, and the blue light LB enter the image formation areas of the light modulation devices 4R, 4G, and 4B, respectively, without being blocked by the incident side polarization plates, respectively.

Incidentally, the integrator optical system 31 disposed close to the light source 20 is easy to generate heat. The projector 1 according to the present embodiment cools a heat generation member such as the integrator optical system 31 with a cooling system (not shown) using, for example, air cooling, water-cooling, or a Peltier element. Therefore, the integrator optical system 31 in the present embodiment improves the radiation performance by adopting a configuration described later to thereby increase the cooling efficiency in the cooling system.

FIG. 2 is a cross-sectional view showing a configuration of an essential part of the integrator optical system 31.

As shown in FIG. 2, the first multi-lens array 21 has a substrate part 42 including a multi-lens surface (a first multi-lens surface) 41a constituted by a plurality of lens surfaces (first lens surfaces) 41. Specifically, the first multi-lens array 21 has a plurality of first small lenses 21a. Each of the surfaces of the first small lenses 21a is formed of one of the lens surfaces 41 of the multi-lens surface 41a.

It should be noted that the surface of the first small lens 21a and the image formation area of each of the light modulation devices 4R, 4G and 4B are conjugated with each other. Further, the shape of each of the first small lenses 21a is a rectangular shape substantially similar to the shape of each of the image formation areas of the light modulation devices 4R, 4G and 4B. Thus, each of the partial light beams emitted from the first multi-lens array 21 efficiently enters each of the image formation areas of the light modulation devices 4R, 4G, and 4B.

The first multi-lens array 21 has a light transmissive layer 43 provided to the substrate part 42, and an antireflection layer 44 disposed on the light transmissive layer 43. The thickness of the light transmissive layer 43 is set in a range of 100 through 1500 nm such as a range of 400 through 600 nm. The thickness of the antireflection layer 44 is set in a range of 100 through 5000 nm such as 393 nm. The thickness of the substrate part 42 is set to be no smaller than 1500 nm such as no smaller than 1.5 mm. In other words, in the present embodiment, the thickness of the light transmissive layer 43 is smaller than the thickness of the substrate part 42, and is larger than the thickness of the antireflection layer 44.

The substrate part 42 has a reverse surface (a second surface) 41b different from the multi-lens surface 41a. In the present embodiment, the reverse surface 41b is a flat surface.

The light transmissive layer 43 is provided to the multi-lens surface 41a of the substrate part 42. The light transmissive layer 43 is a coating layer covering the multi-lens surface 41a, and is formed of a light transmissive material such as $SiO_2$ or SiON. The light transmissive layer 43 in the present embodiment is formed of, for example, $SiO_2$.

In the present embodiment, the antireflection layer 44 is a film for reducing the surface reflection of the first multi-lens array 21, and is formed of a coating film made of, for example, $SiO_2$, $MgF_2$, $Nb_2O_5$, $Ti_3O_5$, $Ta_2O_5$, $Al_2O_3$, or $ZrO_2$. The antireflection layer 44 in the present embodiment is formed of, for example, $Ta_2O_5$. The antireflection layer 44 covers the light transmissive layer 43 and the reverse surface 41b of the substrate part 42.

In the present embodiment, the thermal conductivity of the light transmissive layer 43 made of $SiO_2$ is 1.5 W/m·k, and the thermal conductivity of the antireflection layer 44 made of $Ta_2O_5$ is 3 through 5 W/m·k. In other words, in the present embodiment, the thermal conductivity of the antireflection layer 44 is higher than the thermal conductivity of the light transmissive layer 43.

It should be noted that it becomes possible to arbitrarily control the refractive index of the light transmissive layer 43 in accordance with the coating method selected when forming the film. By controlling the refractive index of the light transmissive layer 43 as described above, it is possible to increase the degree of design freedom of the antireflection layer 44.

The multi-lens surface 41a and the lens surfaces 41 constituting the first multi-lens array 21 according to the present embodiment are manufactured using a molding method of transferring the metal mold shape. There is created the state in which the microscopic asperity on the metal mold surface is also transferred to the multi-lens surface 41a and the lens surfaces 41 of the substrate part 42 manufactured using the molding method described above.

FIG. 3 is an enlarged view showing a configuration of an essential part of the first multi-lens array 21.

As shown in FIG. 3, the multi-lens surface 41a is provided with the asperity 45 caused by the metal mold surface shape. The light transmissive layer 43 is formed so as to get into the asperity 45 provided to the multi-lens surface 41a. In other words, the light transmissive layer 43 planarizes the asperity 45 on the multi-lens surface 41a. It should be noted that the light transmissive layer 43 is formed using a wide variety of processing methods such as DIP, spraying, or spin coating.

In the present embodiment, the light transmissive layer 43 can fill a microscopic crack occurring in the vicinity of a ridge line portion located on a boundary between the lens surfaces 41, and can therefore relax the stress concentration due to thermal expansion to increase the mechanical strength of the first multi-lens array 21. As a result, the thickness of the first multi-lens array 21 is decreased from the design viewpoint to achieve reduction in cost by reduction in material cost, and reduction in product weight.

In the present embodiment, the surface roughness of the light transmissive layer 43 is lower than the surface roughness of the multi-lens surface 41a. Specifically, the surface roughness of the light transmissive layer 43 is no higher than 20 nm. According to this configuration, since the surface roughness of the foundation for forming the antireflection layer 44 is low, it becomes easy to generate the antireflection layer 44. Therefore, since it is possible to form the antireflection layer 44 with a film high in homogeneity, it is possible for the antireflection layer 44 to obtain a desired antireflection performance.

Further, for example, when forming the light transmissive layer 43 using a liquid phase method, it is possible for the light transmissive layer 43 to easily fill ail gaps in a short time due to a capillary action even when there exist the asperity 45 provided to the multi-lens surface 41a to be the foundation, porous gaps which cannot be removed by etching or grinding, or a defect such as a micro crack in a range of, for example, 0.01 μm through 10 μm such as an affected layer. Therefore, the light transmissive layer 43 has a function of increasing the mechanical strength of the substrate part 42.

According to the first multi-lens array 21 related to the present embodiment, the heat generated in the substrate part 42 by the illumination light WL emitted from the light source device 2 becomes to efficiently be transferred toward the antireflection layer 44 high in thermal conductivity via the light transmissive layer 43. Thus, the first multi-lens array 21 becomes excellent in radiation performance. Therefore, since the cooling effect of the first multi-lens array 21 is further enhanced, the cooling performance in the projector 1 is improved.

Here, as a comparative example, there will be described when directly forming the antireflection layer 44 on the multi-lens surface 41a without disposing the light transmissive layer 43.

FIG. 4 is an enlarged view showing a configuration of an essential part of a first multi-lens array according to the comparative example.

The first multi-lens array 21A according to the comparative example shown in FIG. 4 is smaller in contact area with the antireflection layer 44 due to an influence of the asperity 45 provided to the multi-lens surface 41a. Therefore, the heat transfer from the substrate part 42 to the antireflection layer 44 becomes poor. Further, the heat is accumulated in gaps formed between the antireflection layer 44 and the multi-lens surface 41a, namely the asperity 45.

In the first multi-lens array 21A according to the comparative example, the asperity 45 is in a state of including air or in a vacuum state, and is therefore poor in thermal conductivity. Therefore, when the first multi-lens array 21A becomes high in temperature while being in use, since, for example, the substrate part 42 and the antireflection layer 44 are different in amount of thermal expansion from each other, there is a possibility that a crack occurs in the substrate part 42, or the antireflection layer 44 is separated. As a result, there is a possibility that the display quality of the projector deteriorates, or that the light use efficiency of the projector decreases to make the display image dark due to the Fresnel reflection caused by a separated part of the antireflection layer 44.

In contrast, according to the first multi-lens array 21 related to the present embodiment, since the heat is easy to be transferred from the substrate part 42 to the antireflection layer 44 as described above, it is possible to prevent a defect such as a crack from occurring. Further, according to the first multi-lens array 21 related to the present embodiment, since the thermal conductivity is improved by providing the light transmissive layer 43, it is possible to prevent the deterioration of the display quality described above and the decrease in brightness of the display image.

Further, in the configuration of the first multi-lens array 21A according to the comparative example, there is a possibility that diffusion or absorption of the incident light due to the asperity 45 occurs, and as a result, the light reaching the screen decreases to decrease the light use efficiency. Further, there occurs rise in temperature due to the irradiation of the optical member in the light path with the light thus diffused, or rise in temperature due to absorption of the light by the multi-lens array itself, and thus, a high performance cooling system for the projector becomes necessary.

In contrast, according to the first multi-lens array 21 related to the present embodiment, by filling the asperity 45 with the light transmissive layer 43, it is possible to prevent the light use efficiency from decreasing due to the diffusion or the absorption of the incident light. Further, since it is also possible to suppress the rise in temperature of optical components and the multi-lens array itself, it is possible to simplify the cooling system for the projector, and thus, it is possible to achieve reduction in cost, and at the same time, it is possible to reduce the size of the device.

Further, in the configuration of the first multi-lens array 21A according to the comparative example, when, for example, the depth of the asperity 45 is around the wavelength of the incident light, total reflection occurs on the interface with the air or vacuum, and a shift occurs in the phase of the light. As a result, there is a possibility that the light use efficiency decreases in a wavelength band in which the polarization conversion efficiency of the polarization conversion element 32 disposed in the posterior stage is inferior from the design viewpoint.

In contrast, according to the first multi-lens array 21 related to the present embodiment, since the asperity 45 is filled with the light transmissive layer 43, the phase shift in the light does not occur, and this, such a decrease in light use efficiency as described above can be prevented.

Further, in the configuration of the first multi-lens array 21A according to the comparative example, when, for example, the asperity 45 is composed of such holes as mesopores in a range of 2 through 50 nm in diameter, the antireflection layer 44 is disposed in the state in which moisture is adsorbed in the mesopores, and thus, the moisture is confined in the asperity 45 in some cases. Further, when, for example, $TiO_2$ in an amorphous state is used as the antireflection layer 44, when the temperature of the multi-lens array rises to a high temperature, a state transition to a tetragonal structure is caused. In such a structure, due to, for example, the irradiation with an ultraviolet ray from a high-pressure mercury lamp light source, a strong catalytic action occurs, and thus, the moisture included in the asperity 45 is decomposed to generate radical oxygen. The radical oxygen separates the oxygen combined with Ti included in the antireflection layer 44 to decrease the transmittance of the antireflection layer 44, and thus, there arises a problem such as a decrease in light use efficiency of the projector or a decrease in brightness of the display image.

In contrast, according to the first multi-lens array 21 related to the present embodiment, by providing the light transmissive layer 43, it is possible to block the mesopores included in the asperity 45 to prevent the moisture from adsorbing, and at the same time it is possible to improve the thermal conductivity to suppress the rise in temperature of the multi-lens array, and thus it is possible to prevent such a decrease in light use efficiency of the projector as described above.

Further, it is conceivable to improve the surface shape by performing a surface treatment on the multi-lens surface 41a to thereby Increase the contact area between the antireflection layer 44 and the multi-lens surface 41a. However, in order to obtain the surface roughness no higher than, for example, 20 nm, removal processing such as grinding processing or blast processing becomes necessary, and since the processing time is long, productivity slowdown is incurred. Further, when processing the surface shape of the multi-lens surface 41a, there is a possibility of incurring a decrease in surface shape accuracy depending on an amount of the processing or a place of the processing.

In contrast, in the first multi-lens array 21 according to the present embodiment, since the light transmissive layer 43 can be formed using a wide variety of processing methods such as DIP, spraying, or spin coating, the productivity is extremely high, it is easy to make an amount of coating constant, and it is possible to suppress the influence on the surface shape of the multi-lens surface 41a by controlling the film thickness to be no larger than 1 μm. Therefore, in the first multi-lens array 21 according to the present embodiment, the change in surface shape caused by performing surface processing on the multi-lens surface 41a does not occur.

On the other hand, the second multi-lens array 22 has a substrate part 52 including a multi-lens surface (a first multi-lens surface) 51a constituted by a plurality of lens surfaces (first lens surfaces) 51. Specifically, the second multi-lens array 22 has a plurality of second small lenses 22a. Each of the surfaces of the second small lenses 22a is formed of one of the lens surfaces 51 of the multi-lens surface 51a.

The plurality of second small lenses 22a corresponds to the plurality of first small lenses 21a of the first multi-lens array 21. The second multi-lens array 22 forms images of the respective first small lenses 21a of the first multi-lens array 21 in the vicinity of each of the image formation areas of the respective light modulation devices 4R, 4G, and 4B in cooperation with the superimposing optical system 33.

The second multi-lens array 22 has a light transmissive layer 53 provided to the substrate part 52, and an antireflection layer 54 disposed on the light transmissive layer 53. In the present embodiment, the second multi-lens array 22 has substantially the same configuration as that of the first multi-lens array 21. Specifically, the thickness and the material of the light transmissive layer 53, the antireflection layer 54, and the substrate part 52 are set to be substantially the same as the thickness and the material of the light transmissive layer 43, the antireflection layer 44, and the substrate part 42 of the first multi-lens array 21. In the present embodiment, the thickness of the light transmissive layer 53 is smaller than the thickness of the substrate part 52, and is larger than the thickness of the antireflection layer 54.

The substrate part 52 has a reverse surface (a second surface) 51b different from the multi-lens surface 51a. In the present embodiment, the reverse surface 51b is a flat surface.

In the present embodiment, the second multi-lens array 22 is disposed with respect to the first multi-lens array 21 so that the reverse surface 51b is opposed to the reverse surface 41b of the first multi-lens array 21.

The light transmissive layer 53 is provided to the multi-lens surface 51a of the substrate part 52. The antireflection layer 54 covers the light transmissive layer 53 and the reverse surface 51b of the substrate part 52. The thermal conductivity of the antireflection layer 54 is higher than the thermal conductivity of the light transmissive layer 53.

According to the second multi-lens array 22 related to the present embodiment, similarly to the first multi-lens array 21, since the heat generated in the substrate part 52 is efficiently transferred to the antireflection layer 44 via the light transmissive layer 53, the radiation performance becomes excellent.

Further, according to the light source device 2 related to the present embodiment, since the light transmissive layers 43, 53 are respectively provided to both of the first multi-lens array 21 and the second multi-lens array 22, it is possible to dramatically improve the cooling performance of the integrator optical system 31. Thus, since the heat generation of the integrator optical system 31 can be suppressed, the thermal deterioration of other optical components such as the polarization conversion element 32 and the superimposing optical system 33 to be disposed in the posterior stage of the integrator optical system 31 is suppressed.

Advantages of First Embodiment

The first multi-lens array 21 according to the present embodiment is a multi-lens array having the substrate part 42 including the multi-lens surface 41a constituted by the plurality of lens surfaces 41, and has the light transmissive layer 43 provided to the substrate part 42 and the antireflection layer 44 disposed on the light transmissive layer 43, and the thermal conductivity of the antireflection layer 44 is higher than the thermal conductivity of the light transmissive layer 43.

Further, the second multi-lens array 22 according to the present embodiment is a multi-lens array having the substrate part 52 including the multi-lens surface 51a constituted by the plurality of lens surfaces 51, and has the light transmissive layer 53 provided to the substrate part 52 and the antireflection layer 54 disposed on the light transmissive layer 53, and the thermal conductivity of the antireflection layer 54 is higher than the thermal conductivity of the light transmissive layer 53.

According to the first multi-lens array 21 and the second multi-lens array 22 related to the present embodiment, the heat generated in the substrate part 42, 52 is efficiently transferred toward the antireflection layer 44, 54 high in thermal conductivity via the light transmissive layer 43, 53, respectively. Thus, the multi-lens array excellent in radiation performance is provided as the first multi-lens array 21 and the second multi-lens array 22.

In the present embodiment, the thickness of the light transmissive layer 43 is smaller than the thickness of the substrate part 42, and is larger than the thickness of the antireflection layer 44, and the thickness of the light transmissive layer 53 is smaller than the thickness of the substrate part 52, and is larger than the thickness of the antireflection layer 54.

According to this configuration, since the light transmissive layer 43, 53 fills the asperity 45 provided to the surface of the substrate part 42, 52, the surface roughness of the substrate part 42, 52 is suppressed to a level no higher than 20 nm. Thus, since contact area between the antireflection layer 44, 54 and the light transmissive layer 43, 53 increases, it is possible to enhance the cooling effect of the first multi-lens array 21 and the second multi-lens array 22. Further, since the thickness of the light transmissive layer 43 is thinner than the thickness of the substrate part 42, and the thickness of the light transmissive layer 53 is thinner than the thickness of the substrate part 52, the material cost of the light transmissive layer 43 and the light transmissive layer 53 is suppressed, and thus, it is possible to enhance the cooling effect at lower cost.

The light source device 2 according to the embodiment is provided with the light source 20 and the integrator optical system 21 which the light emitted from the light source 20 enters, and the integrator optical system 31 includes the first multi-lens array 21 and the second multi-lens array 22.

According to the light source device 2 related to the present embodiment, since there is provided the integrator optical system 31 including the first multi-lens array 21 and the second multi-lens array 22 excellent in radiation performance, it is possible to provide the light source device high in reliability.

The projector 1 according to the embodiment is provided with the light source device 2 described above, the light modulation devices 4R, 4G, and 4B for modulating the light from the light source device 2 in accordance with the image information, and the projection optical device 6 for projecting the light modulated by the light modulation devices 4R, 4G, and 4B.

According to the projector 1 related to the present embodiment, since there is provided the light source device 2 including the integrator optical system 31 excellent in radiation performance, it is possible to provide the projector with the cooling performance improved.

Second Embodiment

Then, a light source device according to a second embodiment will be described. The light source device according to the present embodiment is different in the configuration of the integrator optical system from the light source device 2 according to the first embodiment. Hereinafter, the integrator optical system will mainly be described. It should be noted that members common to the first embodiment will be denoted by the same reference symbols, and the detailed description thereof will be omitted.

FIG. 5 is 3 cross-sectional view showing a configuration of an essential part of an integrator optical system 131 in the present embodiment. As shown in FIG. 5, the integrator optical system 131 in the present embodiment is provided with the first multi-lens array 21, and a second multi-lens array 122.

The second multi-lens array 122 has the substrate part 52 including the multi-lens surface 51a constituted by the plurality of lens surfaces 51, and the antireflection layer 54. The antireflection layer 54 covers the multi-lens surface 51a and the reverse surface 51b of the substrate part 52. In other words, the second multi-lens array 122 according to the present embodiment does not have the light transmissive layer, and the antireflection layer 54 alone is disposed on the surface of the substrate part 52.

In the integrator optical system 131 in the present embodiment, the light transmissive layer 43 is provided only to the substrate part 42 of the first multi-lens array 21.

Advantages of Second Embodiment

According to the integrator optical system 131 in the present embodiment, since the light transmissive layer 43 is provided only to the first multi-lens array 21, the constituent material of the light transmissive layer halves compared to the integrator optical system 31 in the first embodiment. Further, the integrator optical system 131 in the present embodiment has a configuration effective when putting a high priority on the reduction in cost, or when the radiation performance required for the integrator optical system is relatively low compared to the first embodiment.

In general, in the integrator optical system, the optical design is made so that the multi-lens array located at the light incident side of the pair of multi-lens arrays is brought into focus. Therefore, when the integrator optical system in which the surface roughness of the multi-lens array located at the light incident side is high is supposedly used as the light source device for a projector, there is a possibility that color unevenness, a shadow, or the like is reflected in the picture to be projected on the screen to degrade the image quality.

In contrast, according to the integrator optical system 131 in the present embodiment, since the light transmissive layer 43 is provided to the first multi-lens array 21 located at the light incident side, such a degradation in image quality due to the reflection of the color unevenness, the shadow, or the like as described above is prevented.

Third Embodiment

Then, a light source device according to a third embodiment will be described. The light source device according to the present embodiment is different in the configuration of the integrator optical system from the light source device 2 according to the first embodiment. Hereinafter, the integrator optical system will mainly be described. It should be noted that members common to the first embodiment will be denoted by the same reference symbols, and the detailed description thereof will be omitted.

FIG. 6 is a cross-sectional view showing a configuration of an essential part of an integrator optical system 231 in the present embodiment. As shown in FIG. 6, the integrator optical system 231 in the present embodiment is provided with a first multi-lens array 121, and the second multi-lens array 22.

The first multi-lens array 121 has the substrate part 42 including the multi-lens surface 41a constituted by the plurality of lens surfaces 41. In the first multi-lens array 121 according to the present embodiment, the antireflection layer 44 covers the multi-lens surface 41a and the reverse surface 41b of the substrate part 42. In other words, the first multi-lens array 121 according to the present embodiment does not have the light transmissive layer, and the antireflection layer 44 alone is disposed on the surface of the substrate part 42.

In the first multi-lens array 121 according to the present embodiment, the mechanical strength of glass material is increased using a chemical strengthening treatment. The chemical strengthening treatment is performed by performing ionic substitution on an Na component included in the glass material constituting the substrate part 42 and a K component included in an alkali solvent.

In the integrator optical system 231 in the present embodiment, the light transmissive layer 53 is provided only to the substrate part 52 of the second multi-lens array 22.

Advantages of Third Embodiment

According to the integrator optical system 231 in the present embodiment, since the light transmissive layer 53 is provided only to the second multi-lens array 22, the constituent material of the light transmissive layer halves compared to the integrator optical system 31 in the first embodiment. Further, the integrator optical system 231 in the present embodiment has a configuration effective when putting a high priority on the reduction in cost, or when the radiation performance required for the integrator optical system 231 is relatively low.

In the integrator optical system 231 in the present embodiment, by performing the chemical strengthening treatment on the first multi-lens array 121 which is located at the light incident side to thereby be exposed to a high temperature, it is possible to improve the heat resistance of the first multi-lens array 121. Incidentally, the light transmissive layer is formed of a material not containing Na in some cases, and therefore, it is unachievable to perform the chemical strengthening treatment on the multi-lens array provided with the light transmissive layer. According to the configuration of the present embodiment, the first multi-lens array 121 which is located at the light incident side and is exposed to a high temperature is improved in heat resistance by the chemical strengthening treatment, and regarding the second multi-lens array 22 disposed in the posterior stage, the improvement in radiation performance and the mechanical strength is realized by the light transmissive layer 53. Therefore, according to the present embodiment, since both of the chemical strengthening treatment and the light transmissive layer are used, there is provided a configuration effective from the viewpoint of the degree of design freedom in the integrator optical system.

FIRST MODIFIED EXAMPLE

Then, a first modified example of the light source device will be described. The present modified example is a modified example related to the light source device 2 according to the first embodiment. The present modified example is different in the configuration of the integrator optical system from the first embodiment. Hereinafter, the integrator optical system will mainly be described. It should be noted that members common to the first embodiment will be denoted by the same reference symbols, and the detailed description thereof will be omitted.

FIG. 7 is a cross-sectional view showing a configuration of an essential part of the integrator optical system 331 in the present modified example. As shown in FIG. 7, in the integrator optical system 331 in the present modified example, the light transmissive layer 43 is disposed so as to cover the both surfaces of the first multi-lens array 21. Similarly, the light transmissive layer 53 is disposed so as to cover the both surfaces of the second multi-lens array 22.

Specifically, the light transmissive layer 43 includes a first light transmissive layer 43a and a second light transmissive layer 43b. The first light transmissive layer 43a is provided to the multi-lens surface 41a of the substrate part 42. The second light transmissive layer 43b is provided to the reverse surface 41b of the substrate part 42. Since the reverse surface 41b of the substrate part 42 is covered with the second light transmissive layer 43b to thereby be planarized, processing such as lap-less working becomes unnecessary, and thus, the cost reduction is achieved.

Specifically, the light transmissive layer 53 includes a first light transmissive layer 53a and a second light transmissive layer 53b. The first light transmissive layer 53a is provided to the multi-lens surface 51a of the substrate part 52. The second light transmissive layer 53b is provided to the reverse surface 51b of the substrate part 52. Since the reverse surface 51b of the substrate part 52 is covered with the second light transmissive layer 53b to thereby be planarized, processing such as lap-less working becomes unnecessary, and thus, the cost reduction is achieved.

In the first multi-lens array 21, the antireflection layer 44 is disposed on the first light transmissive layer 43a and the second light transmissive layer 43b. The antireflection layer 44 is disposed so as to cover the multi-lens surface 41a and the reverse surface 41b of the substrate part 42.

In the second multi-lens array 22, the antireflection layer 54 is disposed on the first light transmissive layer 53a and the second light transmissive layer 53b. The antireflection layer 54 is disposed so as to cover the multi-lens surface 51a and the reverse surface 51b of the substrate part 52.

In the present modified example, the thickness of the first light transmissive layer 43a and the thickness of the second light transmissive layer 43b can be made different from each other. By making the first light transmissive layer 43a and the second light transmissive layer 43b covering the both surfaces of the substrate part 42 different in thickness from each other as described above, it becomes possible to control the radiation direction of the heat from the substrate part 42. Similarly, by making the first light transmissive layer 53a and the second light transmissive layer 53b covering the both surfaces of the substrate part 52 different in thickness from each other, it becomes possible to control the radiation direction of the heat from the substrate part 52.

When making one of the first light transmissive layer 43a and the second light transmissive layer 43b larger in thickness than the ether, the heat accumulated in the substrate part 42 becomes apt to be released toward the light transmissive layer larger in thickness. Similarly, when making one of the first light transmissive layer 53a and the second light transmissive layer 53b larger in thickness than the other, the heat accumulated in the substrate part 52 becomes apt to be released toward the light transmissive layer larger in thickness.

In other words, in the projector, when cooling the first multi-lens array 21 and the second multi-lens array 22 with a cooling wind supplied from, for example, a cooling system, by enlarging the thickness of the light transmissive layer located at the side supplied with the cooling wind, the cooling effect of the cooling system is further enhanced. Therefore, it is possible to increase the degree of design freedom of the cooling system in the projector.

SECOND MODIFIED EXAMPLE

Then, a second modified example of the light source device will be described. The present modified example is a modified example related to the light source device 2 according to the second embodiment. The present modified example is different in the configuration of the integrator optical system from the second embodiment. Hereinafter, the integrator optical system will mainly be described. It should be noted that members common to the second embodiment will be denoted by the same reference symbols, and the detailed description thereof will be omitted.

FIG. 8 is a cross-sectional view showing a configuration of an essential part of an integrator optical system 431 in the present modified example. As shown in FIG. 8, the integrator optical system 431 in the present modified example is provided with the first multi-lens array 21, and the second multi-lens array 122. In the integrator optical system 431 in the present modified example, the light transmissive layer 43 is disposed so as to cover the both surfaces of the first multi-lens array 21.

According to the integrator optical system 431 in the present modified example, since only the both surfaces of the first multi-lens array 21 are covered with the light transmissive layer 43, the constituent material of the light transmissive layer halves compared to the configuration of the first modified example. Therefore, the present modified example has a configuration effective when putting a high priority on the reduction in cost, or when the radiation performance required for the integrator optical system is relatively low compared to the first modified example.

THIRD MODIFIED EXAMPLE

Then, a third modified example of the light source device will be described. The present modified example is a modified example related to the light source device 2 according to the third embodiment. The present modified example is different in the configuration of the integrator optical system from the third embodiment. Hereinafter, the integrator optical system will mainly be described. It should be noted that members common to the third embodiment will be denoted by the same reference symbols, and the detailed description thereof will be omitted.

FIG. 9 is a cross-sectional view showing a configuration of an essential part of an integrator optical system 531 in the present modified example. As shown in FIG. 9, the integrator optical system 531 in the present modified example is provided with the first multi-lens array 121, and the second multi-lens array 22. In the integrator optical system 531 in the present modified example, the light transmissive layer 53 is disposed so as to cover the both surfaces of the second multi-lens array 22.

According to the integrator optical system 531 in the present modified example, since only the both surfaces of the second multi-lens array 22 are covered with the light transmissive layer 53, the constituent material of the light transmissive layer halves compared to the configuration of the first modified example. Therefore, the present modified example has a configuration effective when putting a high priority on the reduction in cost, or when the radiation performance required for the integrator optical system is relatively low compared to the first modified example.

Fourth Embodiment

Then, a light source device according to a fourth embodiment will be described. The light source device according to the present embodiment is different in the configuration of the integrator optical system from the light source device 2 according to the first embodiment. Hereinafter, the integrator optical system will mainly be described. It should be noted that members common to the first embodiment will be denoted by the same reference symbols, and the detailed description thereof will be omitted.

FIG. 10 is a cross-sectional view showing a configuration of an essential part of an integrator optical system 631 in the present embodiment. As shown in FIG. 10, the integrator optical system 631 in the present embodiment is formed of a single multi-lens array 60.

The multi-lens array 60 according to the present embodiment has a substrate part 62 including a first multi-lens surface 61a constituted by a plurality of first lens surfaces 61. Specifically, the multi-lens array 60 has a plurality of first small lenses 62a disposed at one surface side. Each of the surfaces of the first small lenses 62a is formed of one of the first lens surfaces 61 of the first multi-lens surface 61a.

The substrate part 62 has a second multi-lens surface (a second surface) 63a different from the first multi-lens surface 61a. In the present embodiment, the second multi-lens surface 63a is disposed at an opposite side to the first multi-lens surface 61a of the substrate part 62. The second multi-lens surface 63a is constituted by a plurality of second lens surfaces 63. Specifically, the multi-lens array 60 has a plurality of second small lenses 62b disposed at an opposite side to the plurality of first small lenses 62a. Each of the surfaces of the second small lenses 62b is formed of one of the second lens surfaces 63 of the second multi-lens surface 63a.

In other words, the multi-lens array 60 according to the present embodiment has the first multi-lens surface 61a and the second multi-lens surface 63a provided to the respective surfaces of the substrate part 62.

The multi-lens array 60 has the light transmissive layer 43 provided to the substrate part 62, and the antireflection layer 44 disposed on the light transmissive layer 43. In the present embodiment, the light transmissive layer 43 is provided to the first multi-lens surface 61a and the second multi-lens surface 63a of the substrate part 62. The antireflection layer 44 covers the first multi-lens surface 61a and the second multi-lens surface 63a via the light transmissive layer 43.

Similarly to other embodiments, the substrate part 62 constituting the multi-lens array 60 according to the present embodiment is manufactured using a molding method of transferring the metal mold shape. Therefore, there is created the state in which the microscopic asperity on the metal mold surface is also transferred to the first multi-lens surface 61a and the second multi-lens surface 63a.

Advantages of Fourth Embodiment

The multi-lens array 60 according to the present embodiment has the substrate part 62 provided with the first multi-lens surface 61a and the second multi-lens surface 63a, the light transmissive layer 43 provided to the substrate part 62, and the antireflection layer 44 disposed on the light transmissive layer 43, and the thermal conductivity of the antireflection layer 44 is higher than the thermal conductivity of the light transmissive layer 43.

According to the multi-lens array 60 related to the present embodiment, the heat generated in the substrate part 62 is efficiently transferred toward the antireflection layer 44 high in thermal conductivity via the light transmissive layer 43. Thus, there is provided the multi-lens array 60 which is provided with a plurality of lenses disposed on both surfaces, and is excellent in radiation performance.

Further, according to the integrator optical system 631 related to the present embodiment, since the integrator optical system is formed of the single multi-lens array 60, the number of components decreases to thereby achieve reduction in weight and reduction in size. Further, in the light source device and the projector each provided with the integrator optical system 631 according to the present embodiment, reduction in weight and reduction in size are also achieved.

Fifth Embodiment

Then, a light source device according to a fifth embodiment will be described. The light source device according to the present embodiment is different in the configuration of the integrator optical system from the light source device 2 according to the first embodiment. Hereinafter, the integrator optical system will mainly be described. It should be noted that members common to the first embodiment will be denoted by the same reference symbols, and the detailed description thereof will be omitted.

FIG. 11 is a cross-sectional view showing a configuration of an essential part of an integrator optical system 731 in the present embodiment. As shown in FIG. 11, the integrator optical system 731 in the present embodiment is formed of a single multi-lens array 150.

The multi-lens array 160 according to the present embodiment has the substrate part 62, the light transmissive layer 43, and the antireflection layer 44. In the integrator optical system 731 in the present embodiment, the light transmissive layer 43 is provided only to the first multi-lens surface 61a in the substrate part 62.

Advantages of Fifth Embodiment

According to the integrator optical system 731 in the present embodiment, since the light transmissive layer 43 is provided only to the first multi-lens surface 61a, the constituent material of the light transmissive layer halves compared to the integrator optical system 631 in the fourth embodiment. Further, the integrator optical system 731 in the present embodiment has a configuration effective when putting a high priority on the reduction in cost, or when the radiation performance required for the integrator optical system is relatively low compared to the fourth embodiment.

Sixth Embodiment

Then, a light source device according to a sixth embodiment will be described. The light source device according to the present embodiment is different in the configuration of the integrator optical system from the light source device 2 according to the first embodiment. Hereinafter, the integrator optical system will mainly be described. It should be noted that members common to the first embodiment will be denoted by the same reference symbols, and the detailed description thereof will be omitted.

FIG. 12 is a cross-sectional view showing a configuration of an essential part of an integrator optical system 831 in the present embodiment. As shown in FIG. 12, the integrator optical system 831 in the present embodiment is formed of a single multi-lens array 151.

The multi-lens array 161 according to the present embodiment has the substrate part 62, the light transmissive layer 43, and the antireflection layer 44. In the integrator optical system 831 in the present embodiment, the light transmissive layer 43 is provided only to the second multi-lens surface 63a in the substrate part 62.

Advantages of Sixth Embodiment

According to the integrator optical system 831 in the present embodiment, since the light transmissive layer 43 is provided only to the second multi-lens surface 63a, the constituent material of the light transmissive layer halves compared to the integrator optical system 631 in the fourth embodiment. Further, the integrator optical system 831 in the present embodiment has a configuration effective when putting a high priority on the reduction in cost, or when the radiation performance required for the integrator optical system is relatively low compared to the fourth embodiment.

It should be noted that the scope of the present disclosure is not limited to the embodiments described above, but a variety of modifications can be provided thereto within the scope or the spirit of the present disclosure.

For example, in the embodiments and the modified examples described above, it is possible for the light transmissive layer to be disposed so as to cover up to side surfaces of the multi-lens array. FIG. 13 is a diagram showing a configuration example in which the side surfaces of the multi-lens arrays are covered with the light transmissive layers. FIG. 13 is a diagram showing the configuration in which the light transmissive layers cover up to the side surfaces of the multi-lens arrays in the integrator optical system in the first modified example.

In an integrator optical system 331 shown in FIG. 13, the light transmissive layer 43 is disposed so as to cover the both surfaces and side surfaces 23 of the first multi-lens array 21, and the light transmissive layer 53 is disposed so as to cover the both surfaces and side surfaces 24 of the second multi-lens array 22. It should be noted that the antireflection layer 44 disposed on the light transmissive layer 43 is disposed so as to cover the both surfaces and the side surfaces 23 of the first multi-lens array 21, and the antireflection layer 54 disposed on the light transmissive layer 53 is disposed so as to cover the both surfaces and the side surfaces 24 of the second multi-lens array 22.

By disposing the light transmissive layer 43, 53 so as to cover up to the side surfaces 23, 24 of the multi-lens array 21, 22 as described above, edge parts of the multi-lens array 21, 22 are covered with the light transmissive layer 13, 53. Therefore, since sharp portions in the edge parts dull, chamfering processing becomes unnecessary. As a result, it is possible to obtain the advantages such as reduction in cost due to reduction in process, or an improvement of operation safety in an assembling operation and so on.

Further, when there is adopted a structure in which the first multi-lens array 21 and the second multi-lens array 22 are disposed close to each other, a gap between the first multi-lens array 21 and the second multi-lens array 22 is made small. In this configuration, when, for example, performing air cooling of the first multi-lens array 21 and the second multi-lens array 22, by supplying the cooling wind to an outer side of the lens arrays 21, 22, the cooling wind blows the light transmissive layers 43, 53 covering the side surfaces 23, 24 of the multi-lens arrays 21, 22, and thus, it becomes possible to enhance the cooling effect.

Besides the above, the specific descriptions of the shape, the number, the arrangement, the material, and so on of the constituents of the light source device and the projector are not limited to those in the embodiments described above, but can arbitrarily be modified. Although in the embodiments described above, there is described the example of installing the light source device according to the present disclosure in the projector using the liquid crystal light valves, the example is not a limitation. The light source device according to the present disclosure can also be applied to a projector using digital micromirror devices as the light modulation devices. Further, the projector is not required to have a plurality of light modulation devices, and can be provided with just one light modulation device.

Although in the embodiments described above, there is described the example of applying the light source device according to the present disclosure to the projector, the example is not a limitation. The light source device according to the present disclosure can also be applied to lighting equipment, a headlight of a vehicle, and so on.

It is also possible for the multi-lens array according to an aspect of the present disclosure to have the following configuration.

The multi-lens array according to the aspect of the present disclosure includes a substrate part, a first multi-lens surface which includes a plurality of first lens surfaces, and which is provided to the substrate part, a light transmissive layer provided to the substrate part, and an antireflection layer disposed on the light transmissive layer, wherein the antireflection layer is higher in thermal conductivity than the light transmissive layer.

In the multi-lens array according to the aspect of the present disclosure, the light transmissive layer may be smaller in thickness than the substrate part, and larger in thickness than the antireflection layer.

In the multi-lens array according to the aspect of the present disclosure, the substrate part may have a second surface different from the first multi-lens surface, the light transmissive layer may include a first light transmissive layer and a second light transmissive layer, the first light transmissive layer may be provided to the first multi-lens surface, and the second light transmissive layer may be provided to the second surface.

In the multi-lens array according to the aspect of the present disclosure, the first light transmissive layer may be different in thickness from the second light transmissive layer.

In the multi-lens array according to the aspect of the present disclosure, the second surface may be a flat surface.

In the multi-lens array according to the aspect of the present disclosure, the second surface may be a second multi-lens surface constituted by a plurality of second lens surfaces.

It is also possible for the light source device according to another aspect of the present disclosure to have the following configuration.

The light source device according to the aspect of the present disclosure includes a light source, and an integrator optical system which light emitted from the light source enters, wherein the integrator optical system includes a first multi-lens array and a second multi-lens array, and at least one of the first multi-lens array and the second multi-lens array is formed of the multi-lens array according to the aspect of the present disclosure.

The light source device according to the aspect of the present disclosure includes a light source, and an integrator optical system which light emitted from the light source enters, wherein the integrator optical system is constituted by the multi-lens array according to the aspect of the present disclosure.

It is also possible for the projector according to another aspect of the present disclosure to have the following configuration.

The projector according to another aspect of the present disclosure includes the light source device according to the aspect of the present disclosure, a light modulation device configured to modulate the light from the light source device in accordance with image information, and a projection optical device configured to project the light modulated by the light modulation device.

What is claimed is:
1. A multi-lens array comprising:
   a substrate part;
   a first multi-lens surface which includes a plurality of first lens surfaces, and which is provided to the substrate part;

a light transmissive layer provided to the substrate part; and an antireflection layer disposed on the light transmissive layer, wherein the antireflection layer is higher in thermal conductivity than the light transmissive layer.

2. The multi-lens array according to claim 1, wherein the light transmissive layer is smaller in thickness than the substrate part, and larger in thickness than the antireflection layer.

3. The multi-lens array according to claim 1, wherein the substrate part has a second surface different from the first multi-lens surface, the light transmissive layer includes a first light transmissive layer and a second light transmissive layer, the first light transmissive layer is provided to the first multi-lens surface, and the second light transmissive layer is provided to the second surface.

4. The multi-lens array according to claim 3, wherein the first light transmissive layer is different in thickness from the second light transmissive layer.

5. The multi-lens array according to claim 3, wherein the second surface is a flat surface.

6. The multi-lens array according to claim 3, wherein the second surface is a second multi-lens surface including a plurality of second lens surfaces.

7. A light source device comprising:

a light source; and an integrator optical system which light emitted from the light source enters, wherein the integrator optical system includes a first multi-lens array and a second multi-lens array, and at least one of the first multi-lens array and the second multi-lens array is formed of the multi-lens array according to claim 1.

8. A light source device comprising:

a light source; and an integrator optical system which light emitted from the light source enters, wherein the integrator optical system is constituted by the multi-lens array according to claim 6.

9. A projector comprising:

the light source device according to claim 7;

a light modulation device configured to modulate light from the light source device in accordance with image information; and a projection optical device configured to project the light modulated by the light modulation device.

10. A projector comprising:

the light source device according to claim 3;

a light modulation device configured to modulate light from the light source device in accordance with image information; and a projection optical device configured to project the light modulated by the light modulation device.

* * * * *